April 8, 1930.    F. ROSENBERG    1,754,051
WELDED JOINT
Filed Oct. 8, 1928
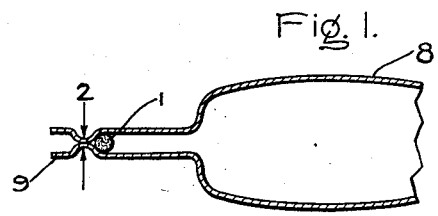
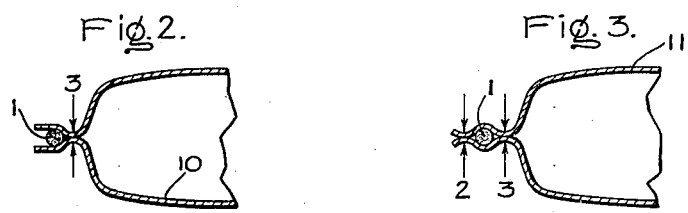
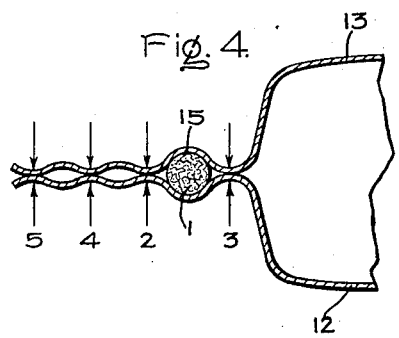
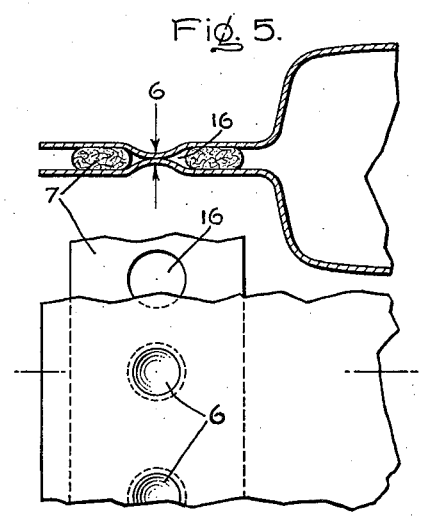
Inventor:
Friedrich Rosenberg,
by Charles V. Tullar
His Attorney.

Patented Apr. 8, 1930

1,754,051

UNITED STATES PATENT OFFICE

FRIEDRICH ROSENBERG, OF SPANDAU, GERMANY, ASSIGNOR TO GENERAL ELECTRIC COMPANY, A CORPORATION OF NEW YORK

WELDED JOINT

Application filed October 8, 1928, Serial No. 311,097, and in Germany November 22, 1927.

My invention relates to improved welded joints for tightly uniting the component parts of pressure vessels. Although not limited thereto, my invention is particularly adapted for tightly joining thin sheet metal structures which have hitherto been united by fusion welding or by means of resistance line welding.

Fusion welding, wherein the parts are fused together and united into an integral whole, is expensive and calls for the services of skilled workmen. Resistance line welding, wherein the parts are heated by the flow of electric current until brought to the plastic state and then welded through the application of pressure progressively applied along a line of contact although cheaper than fusion welding is often difficult of accomplishment because of the fact that unless the parts are carefully cleaned at the point of welding a tight joint cannot be secured. Electric spot welding, wherein the flow of current and the application of pressure is limited to a particular portion of the work, is less sensitive to the effects of dirt at the point of welding than is resistance line welding and it is possible to secure a tight joint by overlapping a plurality of spot welds although this procedure is not generally followed except for making short seams on account of the time consumed in making such a joint.

All the joints made according to the above methods are relatively expensive and it is an object of my invention to make a tight joint between a plurality of parts which is both cheap and rugged and which may be used in place of the joints made by any of the above methods. According to my invention a tight, firm joint is made by securing the parts one to another by a plurality of spot welds which assume the mechanical strains occurring at the joint and firmly clamp the parts together against a packing strip inserted between the parts for rendering the joint pressure tight. The spacing and number of spot welds employed in securing the parts together will depend upon the desired strength of the joint or the number that are found necessary for securely clamping in place the packing that is inserted in the joint for making it pressure tight. The welds are preferably located on that side of the packing opposite which pressure is exerted but the welds may be made on either or both sides of the packing or through perforations in the packing.

In the drawings Figs. 1 to 4 show different sectional views of containers embodying examples of joints according to my invention and Fig. 5 shows a sectional view as well as a plan view of a portion of a container provided with another form of joint according to my invention.

In Figs. 1 to 4 the packing comprises a cord 1 of asbestos or other suitable packing material which may or may not be impregnated with a suitable packing fluid. In Fig. 1 the overlapping parts 9 of the container 8 are connected to one another by a series of spot welds 2 located exterior of the packing 1 which is securely held in place by these welds against pressure from within the container. In the arrangement illustrated in Fig. 2 the relative positions of the packing 1 and the series of spot welds 3 with respect to the container 10 are reversed. The container illustrated in Fig. 2 is designed to withstand pressure from without and the spot welds 3 are located on the side of the packing 1 opposite that against which pressure is exerted from without. In Fig. 3 the rim portions of the container 11 are united by a series of spot welds 2 and 3 located on each side of the packing 1 thereby combining in one structure the types of joint illustrated in Figs. 1 and 2. The container 11 of Fig. 3 is thus capable of withstanding pressures from both within and without. The joint illustrated in Fig. 4 is quite similar to the joint illustrated in Fig. 3 with the exception that two additional rows of spot welds 4 and 5 have been added in the flanged portions of the container in order to strengthen the joint. Furthermore, in Fig. 4 both the parts 12 and 13 have been provided with grooves or passageways 15 for more conveniently holding the packing 1. It is, of course, apparent that a single groove in one of the members would suffice equally well for positioning the packing 1. It is not always necessary, however, to provide such a packing groove or passage since the parts of the container may be forced together about the packing by pressure exerted during the welding operation as in Figs. 1, 2, 3 and 5.

In Fig. 5 the packing strip 7 is provided with holes or perforations 16 spaced along its length through which a series of spot welds 6 are made by forcing the parts of the container together at these points during welding. The welds 6 serve to mechanically secure the portions of the container one to another and at the same time clamp the packing strip 7 both against displacement toward the inside as well as displacement toward the outside of the container by reason of any pressures acting from without or within the container.

The welding operation should be performed with a spot welding machine provided with control means for cutting off the welding current while the parts are still held firmly together by the electrodes so that the weld may become cold and capable of holding the parts together under pressure before the electrodes are separated for moving the work. In this manner welds which tightly clamp the packing strip in place and form a tight joint may be secured. Since machines of the nature indicated are well known in the art it is not necessary for an understanding of this invention to describe such a machine in detail here.

What I claim as new and desire to secure by Letters Patent of the United States is:

1. A joint comprising a plurality of overlapped parts, a packing therebetween, and a plurality of spot welds spaced along the joint for holding said parts together with the packing in adjusted position therebetween.

2. A joint comprising a plurality of spaced parts with packing therebetween, said parts being forced together and welded to one another at a plurality of places spaced along the joint and located adjacent said packing.

3. A pressure-tight joint comprising a plurality of overlapped parts, packing therebetween, and a plurality of spot welds for holding said parts together with packing between said welds and the source of pressure.

4. A joint comprising a plurality of overlapped parts, an asbestos packing strip between said parts, and a series of resistance spot welds spaced along the joint and adjacent said packing strip for holding said parts together with the packing strip in adjusted position therebetween.

5. A joint comprising a plurality of overlapped parts, a packing strip impregnated with a liquid packing medium between said parts, and a series of spot welds spaced along the joint and arranged adjacent said packing strip for holding said parts together with the packing strip in adjusted position therebetween.

6. A joint comprising a plurality of overlapped parts having a packing therebetween, said parts being held together and said packing being held in place by a plurality of spot welds spaced along the joint.

In witness whereof, I have hereunto set my hand this 20th day of September, 1928.

FRIEDRICH ROSENBERG.